United States Patent Office 3,429,609
Patented Feb. 25, 1969

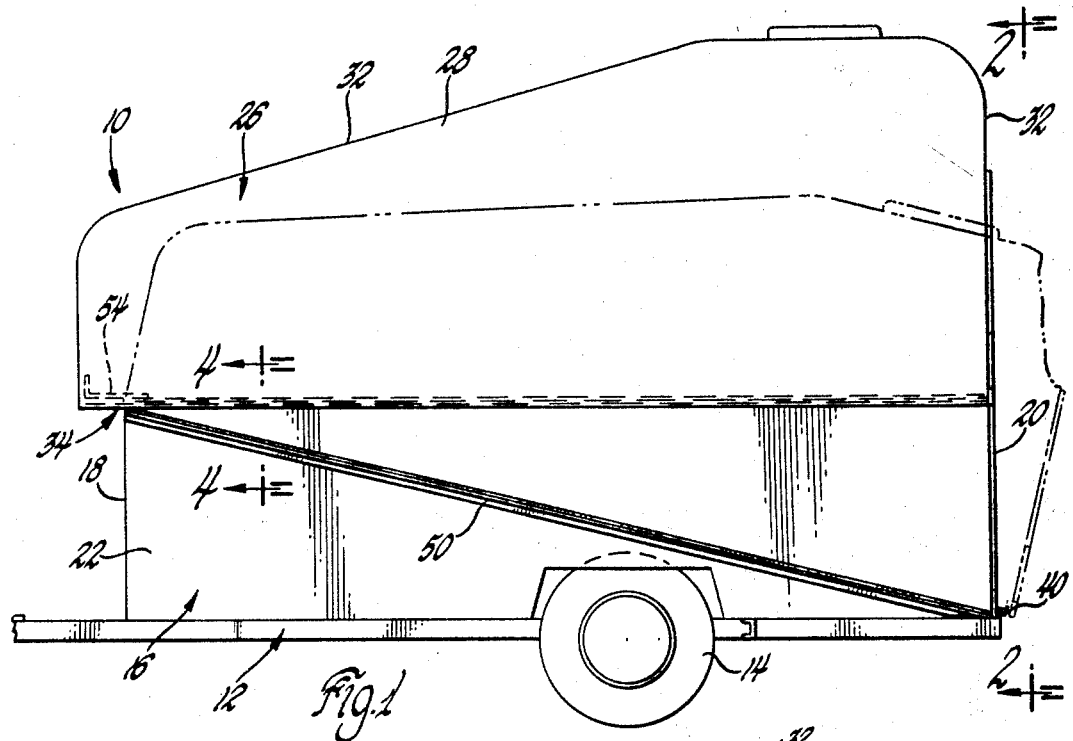
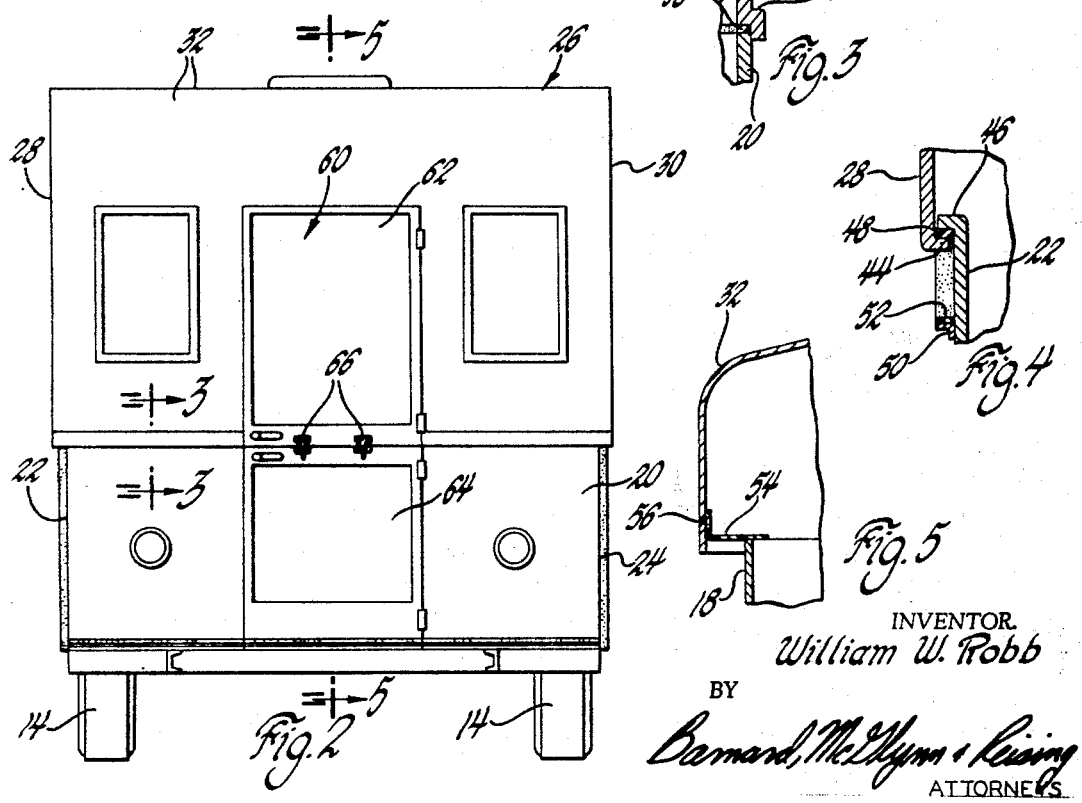

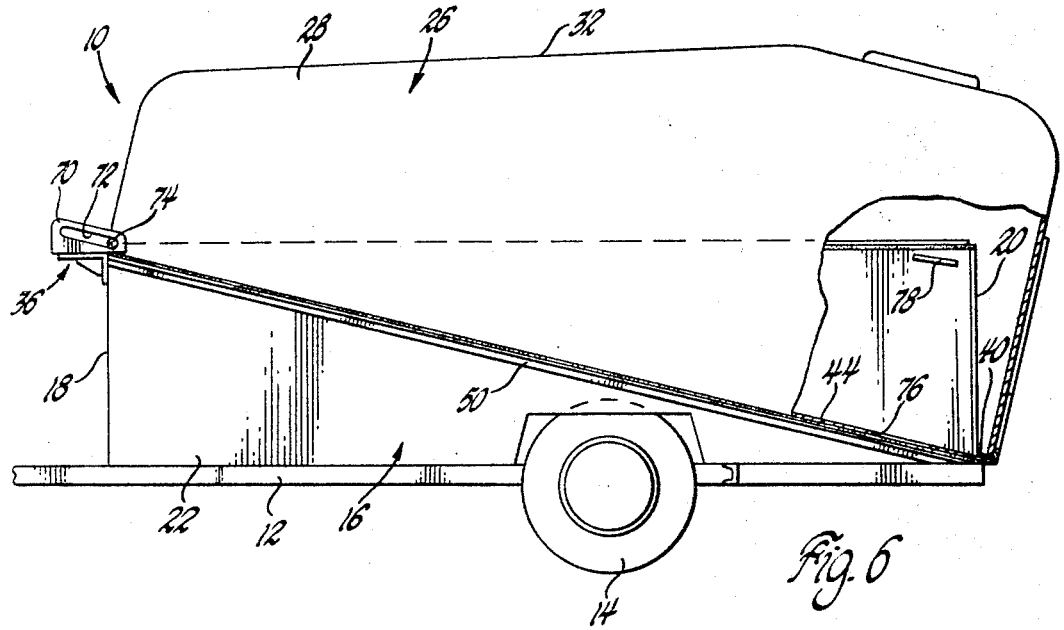
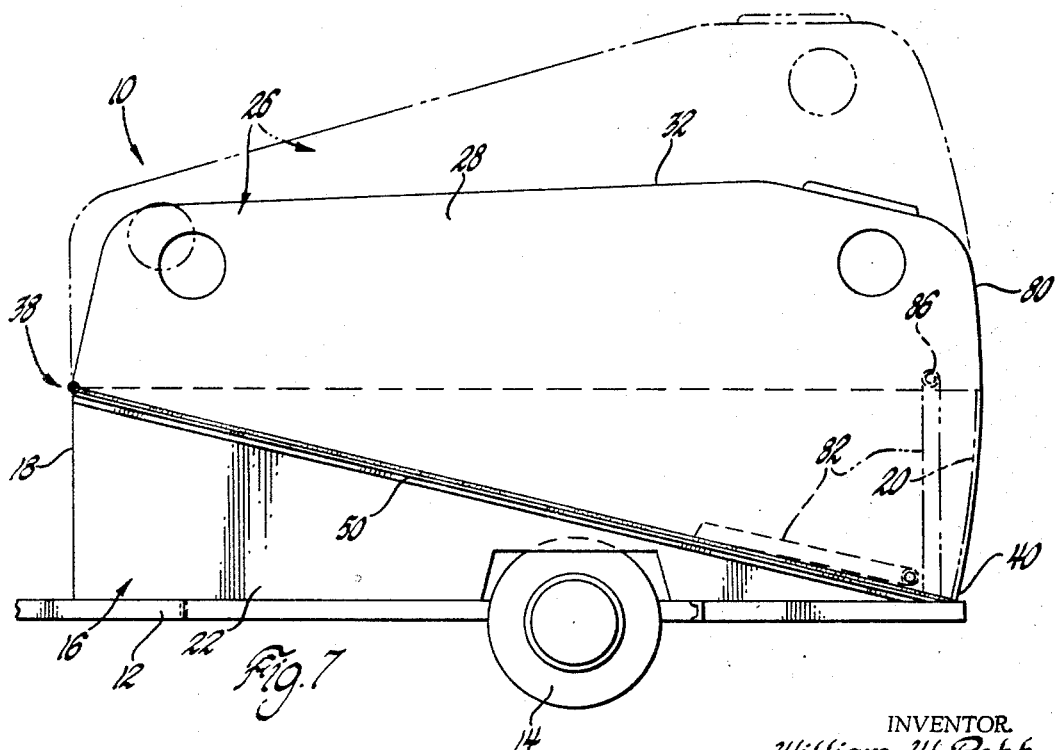

3,429,609
COLLAPSIBLE TRAILER
William W. Robb, 31406 Meadows,
Madison Heights, Mich. 48071
Filed Mar. 28, 1966, Ser. No. 537,965
U.S. Cl. 296—23                               14 Claims
Int. Cl. B60p 3/34; B62d 53/04

ABSTRACT OF THE DISCLOSURE

A collapsible trailer assembly including a frame supported by a plurality of wheels, a bottom portion disposed on the frame and having an opening defined by the upper extremities of the walls thereof, a top portion having an opening defined by the lower extremities of the walls thereof, and pivot means operatively connecting the top portion to the bottom portion adjacent the upper extremity of the front wall of the bottom portion for allowing the top portion to pivot relative to the bottom portion between a collapsed position and an expanded position so that the periphery of the opening in the top portion is disposed in overlapping relationship with the bottom portion in both the collapsed and expanded positions.

---

This invention relates to a collapsible trailer, or the like, and, more specifically, to a body assembly comprising a bottom portion, and a top portion pivotally attached to the bottom portion for movement between a collapsed position and an expanded position in a manner such that the top portion is in overlapping and sealed relationship with the bottom portion about the periphery thereof in both the collapsed and expanded positions.

There are various types of trailers known in the prior art which include collapsible body assemblies and which are expanded for occupancy at a camping site, or the like, and which are collapsible for movement over the highway. One type of such a known trailer includes various body components which move rectilinearly relative to one another to telescope within each other to collapse the trailer body. These trailer assemblies are often accompanied by mechanical problems because various complex mechanisms are utilized to move the members rectilinearly relative to one another. Furthermore, the mechanisms and interconnecting body components in such telescoping type trailers are usually difficult to operate by women and children and are very expensive. Another well-known trailer body assembly is one utilizing two major body sections which pivot relative to one another between a collapsed position and an expanded position and includes a third body section for interconnecting or closing the opening between the two main body sections when in the expanded position. Normally, the third section includes numerous foldable panels which are folded together when the trailer is in the collapsed position and which are unfolded to close the opening between the two main body sections when in the expanded position and/or pieces of canvas which are disposed between the two main body sections to close the opening therebetween in the expanded position. There are numerous problems associated with assemblies utilizing the foldable panels in that the panels are often difficult to manipulate and a great deal of time is frequently required to fold and unfold such panels. Additionally, such panels have many joints which as a practical matter make it nearly impossible to provide a sealed trailer body when in the expanded position. The same is true of the trailers utilizing canvas pieces since it is nearly impossible to provide an adequate seal between the man body sections with a piece of canvas.

Accordingly, it is an object and feature of this invention to provide a trailer utilizing a body including two main body portions which are pivotal relative to one another and which are disposed in an overlapping sealed relationship in both the collapsed and expanded positions.

Another object and feature of this invention is to provide a trailer having a body comprising two main portions which are pivotally connected together for movement between a collapsed position and an expanded position without utilizing complex mechanisms, or the like, and which may be collapsed and expanded with a minimum of effort.

A further object and feature of this invention is to provide a collapsible trailer body having two main portions, one of which may be pivoted relative to the other between a collapsed and expanded position, and at which positions the body portions are in sealed engagement with one another to eliminate the need for additional canvas pieces, foldable panel sections, or the like.

In general, these and other objects and features of this invention may be attained in a preferred embodimnt including a frame supported by a plurality of wheels, a bottom box-like portion disposed on the frame and having an opening defined by the upper extremities of its sides, and a top portion having an opening defined by the lower extremities of its sides. A pivot means operatively connects the lower extremity of the top portion to the upper extremity of the bottom portion at the front of the trailer for allowing the top portion to pivot relative to the bottom portion beween a collapsed position and an expanded position. The lower extremity of the top portion at the rear of the trailer engages the lower extremity of the rear side of the bottom portion when the trailer is in the collapsed position. The top portion of the body may be pivoted to the expanded position where the lower extremity of the rear of the top portion is in sealing engagement with the upper extremity of the rear side of the bottom portion. Thus, the top portion is disposed in overlapping relationship with the bottom portion in both the collapsed and expanded positions. A pair of flanges are disposed adjacent the lower extremities of the top portion, and coacting flanges are disposed adjacent the upper extremities of the sides of the bottom portion for sealing engagement with the flanges on the top portion when the top portion is in the expanded position. There is also included another pair of flanges disposed on the sides of the bottom portion for sealing engagement with the flanges on the top portion when the trailer is in the collapsed position. Additional sealing means are disposed at the front and rear portions of the trailer so that the top portion is in sealed relationship with the bottom portion of the body when the trailer is in the collapsed or the expanded position.

Other objects and attendant advantages of this invention will be readily appreciated as the same becomes better understood by reference to the following detailed description when considered in connection with the accompanying drawings wherein:

FIGURE 1 is a side elevational view of a preferred embodiment of the instant invention;

FIGURE 2 is a view taken substantially along line 2—2 of FIGURE 1;

FIGURE 3 is an enlarged fragmentary cross-sectional view taken substantially along line 3—3 of FIGURE 2;

FIGURE 4 is an enlarged fragmentary cross-sectional view taken substantially along line 4—4 of FIGURE 1;

FIGURE 5 is a reduced fragmentary view taken substantially along line 5—5 of FIGURE 2;

FIGURE 6 is a side elevational view of another preferred embodiment of the instant invention; and FIGURE 7 is a side elevational view of another preferred embodiment of the instant invention.

Referring to the drawings wherein like numerals indicate like or corresponding parts throughout the several views, a trailer having a collapsible body assembly is generally shown at 10. The trailer includes a frame, generally indicated at 12, which is supported by the wheels 14.

A bottom portion, generally indicated at 16, has a floor which is secured to the frame 12 and includes a front wall 18 and a rear wall 20, each of which extends upwardly from the respective front and rear ends of the floor. The bottom portion 16 also includes the side walls 22 and 24 which extend upwardy from the sides of the floor. One end of the side wall 22 is connected to one end of front wall 18, the other end of the side wall 22 is connected to one end of the rear wall 20. One end of the side wall 24 is connected to the other end of the front wall 18, and the other end of the side wall 24 is connected to the other end of the rear wall 20. The upper extremities of the side walls 22 and 24 and the front and rear walls 18 and 20 define an opening in the top of the bottom portion 16.

The assembly also includes a top portion, generally indicated at 26, which includes a pair of side walls 28 and 30 and an upper wall means 32 which interconnects the side walls 28 and 30 and extends about the upper peripheries of the side walls 28 and 30 from the respective front lower extremities of the side walls to the respective rear lower extremities of the side walls. Thus, the lower extremities of the side walls and the lower extremities of the wall means 32 define an opening in the bottom of the top portion 26.

There is also included pivot means, which are generally shown at 34, 36 and 38 in the respective embodiments, for operatively connecting the top portion 26 to the bottom portion 16 adjacent the upper extremity of the front wall 18 for allowing the top portion 26 to pivot relative to the bottom portion 16 between a collapsed position and an expanded position. The expanded position is shown in solid lines in FIGURE 1 and the collapsed position is shown in phantom in FIGURE 1, the collapsed position is shown in FIGURE 6, and the collapsed position is shown in solid with the expanded position being shown in phantom in FIGURE 7.

A first lower extremity 40 of the wall means 32 of the top portion 26 is in engagement with the rear wall 20 of the bottom portion 16 when the top portion 26 is in the collapsed position. It will be noted that the side walls 28 and 30 of the top portion 16 are in overlapping relationship with the side walls 22 and 24 of the bottom portion 16 when the top portion 26 is in the collapsed position. Also, the entire length of the lower extremity of the side walls 28 and 30 of the top portion 26 are in overlapping relationship with the side walls 22 and 24 of the bottom portion 16 when the top portion 26 is in the expanded position. In the expanded position, the first lower extremity 40 of the wall means 32 of the top portion 26 is in overlapping relationship with the rear wall 20 of the bottom portion 16.

A sealing means is included for sealing the front and rear walls 18 and 20 and the side walls 22 and 24 with the side walls 28 and 30 and the lower extremities of the wall means 32 when the top portion 26 is in either the collapsed position or the expanded position. More specifically, the sealing means includes a first flange 44 disposed adjacent the lower extremity of each of the side walls 28 and 30 of the top portion 26, as is best illustrated in FIGURE 4. Additionally, a second flange 46 is disposed adjacent the upper extremity of each of the side walls 22 and 24 of the bottom portion 16 for sealing engagement with the flanges 44 when the top portion 26 is in the expanded position as illustrated in FIGURE 4. A resilient seal 48 is secured to the flange 46 to provide an air or liquid tight seal between the flanges 44 and 46 when the top portion is in the expanded position. There is also included a third flange 50 disposed on each of the side walls 22 and 24 of the bottom portion 16 for sealing engagement with the first flanges 44 when the top portion 26 is in the collapsed position. A resilient seal 52 is disposed on the flange 50 to provide an air or liquid tight seal between the flanges 44 and the flange 50 when the top portion 26 is in the collapsed position. The sealing means also includes a flap 54 which is disposed adjacent the front wall 18 and is flexibly secured by the rivet 56 to the front lower extremity of the wall means 32 for sealing the top portion 26 to the bottom portion 16, which is best illustrated in FIGURE 5. The flap 54 rides back and forth on the top of the front wall 18 and the top of the side walls 22 and 24 when the top portion 26 is moved between collapsed and expanded positions for maintaining a seal between the top portion 26 and the bottom portion 16 in all positions of the top portion relative to the bottom portion. Also, the lower portion 40 of the wall means 32 includes a means taking the form of a flange, as best illustrated in FIGURE 3, for resting upon the upper extremity of the rear wall 20 when the top portion 26 is in the expanded position. A resilient seal 58 is secured to the wall means 32 and is adapted to engage the rear wall 20 when the top portion 26 is in the collapsed position. Thus, the top portion 26 is in sealed relation with the bottom portion 16 when in either the collapsed or the expanded position.

There is also included a door means generally indicated at 16 in FIGURE 2 which is disposed in the wall means 32 of the top portion 26 and in the rear wall 20 of the bottom portion 16 for providing an entrance into the trailer when the top portion 26 is in the expanded position. More specifically, the door means 60 includes a first door portion 62 which is pivotally attached to the wall means 32 and a second door portion 64 which is pivotally attached to the rear wall 20. The door portions 62 and 64 are adapted through the latches 66 for connection to one another to provide a unitary door when the top portion 26 is in the expanded position.

Turning now to the individual embodiments, the embodiment illustrated in FIGURES 1 and 2 utilizes a hinge means 34 for pivotally connecting the top portion 26 to the bottom portion 16. The hinging action is accomplished by the coaction of the flanges 44, 46 and 50 in that the flanges 44 on the top portion 26 engage the upper end of the flanges 50 to allow the top portion 26 to pivot between the collapsed and expanded positions. At the same time, the flanges 44 slide horizontally relative to the ends of the flanges 50 to allow the top portion 26 to move horizontally relative to the bottom portion 16. In moving the top portion 26 from the collapsed position shown in phantom in FIGURE 1 to the expanded position shown in solid lines in FIGURE 1, the top portion 26 is pivoted about the upper ends of the flanges 50 and is moved horizontally so that the lower extremity 40 of the wall means 32 is disposed in sealing engagement with the rear wall 20 of the bottom portion 16, as is more clearly shown in FIGURE 3. Thus, the top portion 26 is maintained in the expanded position due to the fact that the lower extremity 40 of the wall means 32 rests upon the upper extremity of the rear wall 20.

The embodiment illustrated in FIGURE 6 operates in a similar manner to the embodiment illustrated in FIGURES 1 and 2 in that it includes a pivot means 36 which allows the top portion 26 to move horizontally relative to the bottom portion 16 for disposing the lower extremity 40 of the wall means 32 on top of the rear wall 20 of the bottom portion 16. More specifically, the pivot means 36 includes a pair of members 70 which are attached to the bottom portion 16. Each of the members 70 includes an elongated slot 72 which is inclined relative to the horizontal. A pair of pins 74 are attached to the top portion 26 and are rotatably and slidably disposed in the respective slots 72. The flange 44 in the embodiment of FIGURE 6 has a cut out portion 76 for allowing a tab 78 to move therethrough. It will be noted that the tab 78 is also inclined relative to the horizontal. Thus, the top portion 26 in the embodiment of FIGURE 6 is pivoted from the collapsed position upward toward the expanded position so that the pins 74 rotate in the slots 72 and the tab 78 moves through the cut out portion 76 in the flange 44. When the top portion 26 has been moved to this position, it is then moved or slid horizontally to the left as viewed in FIGURE 6 so that the tabs 78 engage the lower surfaces of the flanges 44 and the pins 74 move in the inclined slots 72 so that the flanges 44 are urged upwardly into sealing engagement with the flanges 46. The tabs 78 engage the lower portions of the flanges 44 to maintain the top portion 26 in the expanded position. The embodiment of FIGURE 6 also utilizes a flap 54 as shown in FIGURE 5.

Turning now to the embodiment illustrated in FIGURE 7, the pivot means 38 is a hinge which pivotally interconnects the top portion 26 to the bottom portion 16 and defines an axis about which the top portion 26 pivots relative to the bottom portion 16. The configuration of the embodiment illustrated in FIGURE 7 differs somewhat from the previously described embodiments in that the wall means 32 of the top portion 26 includes an arcuate section 80 which extends upwardly in an arc from the lower extremity 40. The arc of the arcuate section 30 is defined by a portion of a circle having a center on the axis defined by the hinge means 38 about which the top portion 26 pivots relative to the bottom portion 16. In addition, the rear wall 20' of the bottom portion 16 extends upwardly from the floor in an arc which is defined by a portion of a circle having a center on the axis of the pivot means 38 about which the top portion pivots relative to the bottom portion. The circle defining the rear wall 20', however, is slightly smaller in radius than the circle defining the arcuate section 80 so that the arcuate section 80 of the wall means may be disposed in overlapping relationship with the rear wall 20' of the bottom portion, as indicated in FIGURE 7.

A latch means comprising the links 82 is pivotally attached at 86 to the top portion 26 for securing the top portion 26 in the expanded position. As shown in phantom in FIGURE 7, the link 82 pivots to a vertical position and engages the floor of the trailer to hold the top portion 26 in the expanded position. The link 82 pivots to and is secured in a position along the side wall of the top portion when the top portion is in a collapsed position. It will be understood, of course, that various latching means may be utilized with any one of the illustrated embodiments to secure the top portion in either or both the collapsed and expanded positions.

The instant invention, therefore, provides a body assembly of the type suitable for a trailer having two major body portions which are pivotally connected together for movement between a collapsed position and an expanded position and which are in sealing relationship with each other in both the collapsed and expanded positions, thus eliminating the need for folding panels, canvas, or the like, to close open areas between the body portions when in the expanded position.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A collapsible trailer assembly comprising: a frame supported by a plurality of wheels, a bottom portion including a floor, front and rear walls extending upwardly from the respective ends of said floor, and side walls extending upwardly from the sides of said floor, one end of each side wall being connected to one end of said front wall and the other end of each side wall being connected to one end of said rear wall, the upper extremities of said side walls and said front and rear walls defining an opening in said bottom portion; a top portion including a pair of side walls, front and rear walls and top wall means extending therebetween so that the lower extremities of said side walls and said front and rear walls of said top portion define an opening in said top portion; pivot means operatively connecting said top portion to said bottom portion adjacent the upper extremity of said front wall of said bottom portion and the lower extremity of said front wall of said top portion for allowing said top portion to pivot relative to said bottom portion between a collapsed position and an expanded position; said front wall of said top portion extending upwardly from said pivot means when said top portion is in said expanded position; said floor being substantially planar between said side walls and said front and rear walls of said bottom portion; said rear wall of said top portion extends vertically higher than said front wall of said top portion when the latter is in said expanded position and said top means slopes downwardly from said rear wall to said front wall of said top portion; said side walls and said rear wall of said top portion being in overlapping relationship with said side walls and said rear wall of said bottom portion when said top portion is in said collapsed position; the entire length of said lower extremities of said side walls of said top portion being in overlapping relationship with said side walls of said bottom portion when said top portion is in said expanded position; said rear wall of said top portion having a first lower extremity in overlapping relationship with said rear wall of said bottom portion when said top portion is in said expanded position; and sealing means for sealing said front and rear walls and said side walls of said bottom portion with said side walls and said front and rear walls of said top portion when said top portion is disposed in said collapsed and in said expanded positions.

2. An assembly as set forth in claim 1 wherein said sealing means includes a first flange disposed adjacent the lower extremity of each of said side walls of said top portion, a second flange is disposed adjacent the upper extremity of each of said side walls of said bottom portion for sealing engagement with one of said first flanges when said top portion is in said expanded position, and a third flange disposed on each of said side walls of said bottom portion for sealing engagement with said first flanges when said top portion is in said collapsed position.

3. An assembly as set forth in claim 2 including a first resilient seal disposed between each of said first and second flanges when said top portion is in said expanded position, and a second resilient seal disposed between each of said first and third flanges when said top portion is in said collapsed position.

4. An assembly as set forth in claim 1 including door means disposed in said wall of said top portion and in said rear wall of said bottom portion for providing an entrance when said top portion is in said expanded position.

5. An assembly as set forth in claim 4 wherein said door means includes a first door portion pivotally attached to said rear wall of said top portion and a second door portion pivotally attached to said rear wall of said bottom portion, said first and second door portions being adapted for connection to one another to provide a unitary door when said top portion is in said expanded position.

6. An assembly as set forth in claim 4 including latch means for securing said top portion in position relative to said bottom portion.

7. An assembly as set forth in claim 1 wherein said rear wall of said top portion includes an arcuate section which extends upwardly in an arc from said first lower extremity thereof, said arc being defined by a portion of a circle having a center on the axis about which said top portion pivots relative to said bottom portion.

8. An assembly as set forth in claim 7 wherein said rear wall of said bottom portion extends upwardly from said floor in an arc which is defined by a portion of a circle having a center on the axis about which said top portion pivots relative to said bottom portion, said arcuate section of said wall means being disposed to overlap said rear wall of said bottom portion.

9. An assembly as set forth in claim 1 wherein said pivot means allows said top portion to move horizontally relative to said bottom portion for disposing said first lower extremity of said rear wall of said top portion in sealing engagement with said rear wall of said bottom portion.

10. An assembly as set forth in claim 9 wherein said sealing means includes a first flange disposed adjacent the lower extremity of each of said side walls of said top portion, a second flange disposed adjacent the upper extremity of each of said side walls of said bottom portion for sealing engagement with one of said first flanges when said top portion is in said expanded position, and a third flange disposed on each of said side walls of said bottom portion for sealing engagement with said first flanges when said top portion is in said collapsed position.

11. An assembly as set forth in claim 10 including a flap disposed adjacent said front wall and flexibly secured to the second lower extremity of said front wall of said top portion for sealing said top portion to said bottom portion.

12. An assembly as set forth in claim 10 wherein said pivot means includes a pair of members attached to one of said top portion and said bottom portion, said members having parallel elongated slots therein, and a pair of pins attached to the other of said top portion and said bottom portion, each of said pins rotatably and slidably disposed in one of said slots.

13. An assembly as set forth in claim 12 wherein said slots include an inclined section for moving said pins upwardly as said top portion is moved horizontally to urge said first flanges into sealing engagement with said second flanges as said top portion is moved to said expanded position.

14. An assembly as set forth in claim 10 wherein said first lower portion of said rear wall of said top portion means resting upon the upper extremity of said rear wall when said top portion is in said expanded position.

References Cited

UNITED STATES PATENTS

| | | | |
|---|---|---|---|
| 2,640,721 | 6/1953 | Kors | 296—23.2 |
| 3,168,343 | 2/1965 | Marcel | 296—27 |
| 3,326,594 | 6/1967 | Van Atta | 296—23 |
| 3,212,810 | 10/1965 | Bass | 296—23.3 |
| 2,739,833 | 3/1956 | Schenkel | 296—23.3 |

FOREIGN PATENTS 308,167   6/1955   Switzerland.

PHILIP GOODMAN, *Primary Examiner.*

U.S. Cl. X.R.

296—27